United States Patent [19]

Oler

[11] Patent Number: 5,472,466
[45] Date of Patent: Dec. 5, 1995

[54] SMOKER'S MODULE

[76] Inventor: James H. Oler, 1818 6th Ave., Canyon, Tex. 79015

[21] Appl. No.: 237,845

[22] Filed: May 4, 1994

[51] Int. Cl.$^6$ .................................................. B01D 46/00
[52] U.S. Cl. ........................... 55/385.2; 55/467; 454/253
[58] Field of Search .............................. 55/467, 385.2; 454/187, 251, 253

[56] References Cited

U.S. PATENT DOCUMENTS

| | | | |
|---|---|---|---|
| 3,302,547 | 2/1967 | Wasserman | 454/253 |
| 3,601,031 | 8/1971 | Abel et al. | 55/385.2 |
| 4,316,405 | 2/1982 | Esposito | 454/253 |
| 4,378,727 | 4/1983 | Doss | 454/251 |
| 4,694,736 | 9/1987 | Yamagata et al. | 55/385.2 |
| 4,726,824 | 2/1988 | Staten | 55/385.2 |
| 4,804,392 | 2/1989 | Spengler | 55/385.2 |
| 4,883,512 | 11/1989 | Griffis | 55/385.2 |
| 5,074,894 | 12/1991 | Nelson | 55/385.2 |
| 5,074,897 | 12/1991 | Sikich | 55/385.2 |
| 5,085,134 | 2/1992 | Hofstra et al. | 55/385.2 |
| 5,236,476 | 8/1993 | Klick | 55/385.2 |
| 5,360,372 | 11/1994 | Newman et al. | 454/253 |

*Primary Examiner*—C. Scott Bushey

[57] ABSTRACT

Disclosed is a smoker's module for isolating, containing, venting, and filtering tobacco smoke with a self-contained expandable modular structure adapted for use as both a freestanding unit and as an addition within an existing structure. The smoker's module comprises a plurality of joinable panel assemblies forming a tobacco smoke isolating enclosure having a plurality of walls, a roof, and at least one sealable user entry door. The panel assemblies each comprise a metal frame having a gasketed transparent safety glass panel mounted therein. A plurality of intake vent apertures extend through panel assembly frames proximal the floor. An exhaust vent aperture, having an electrically powered fan mounted therein, causes fresh air to be drawn into the enclosure through the intake apertures while tobacco smoke-laden air is simultaneously expelled through the exhaust vent aperture. The exhaust aperture also has a porous filter element mounted therein whereby tobacco smoke particles are removed and retained prior to the air being released outside the enclosure.

3 Claims, 3 Drawing Sheets

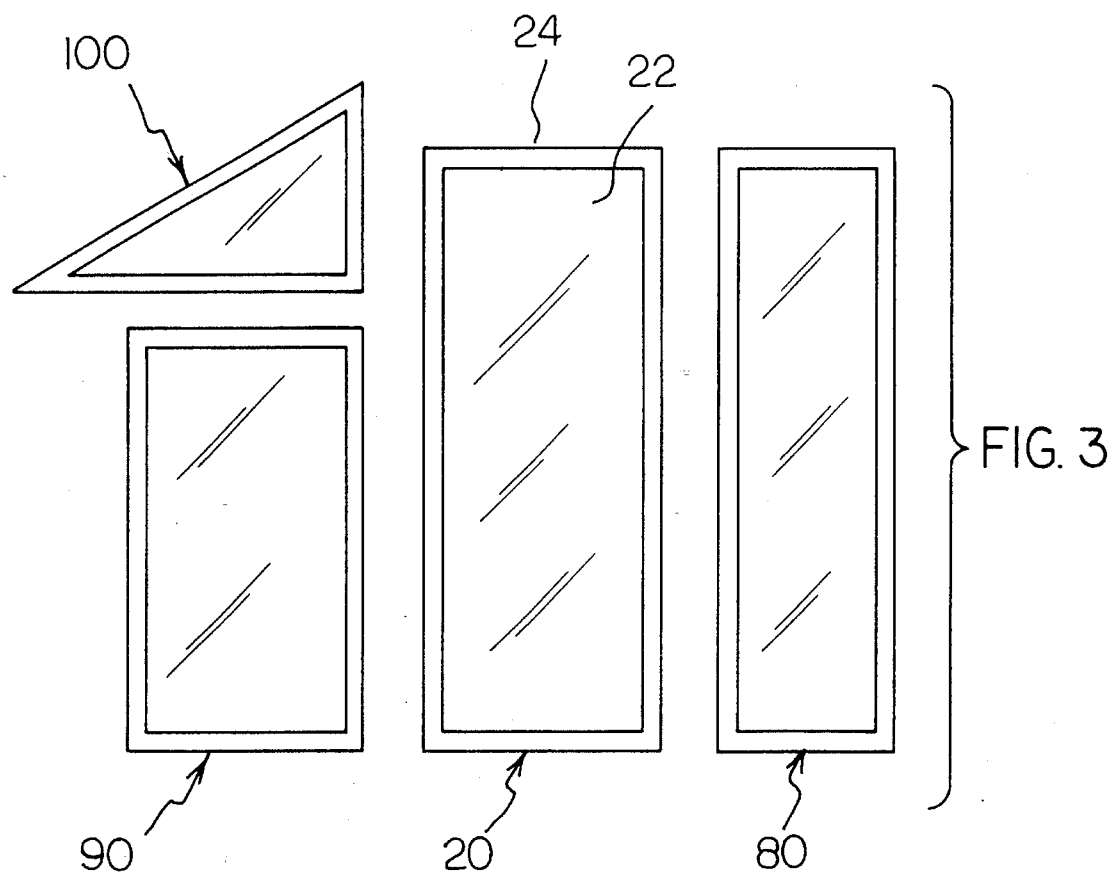
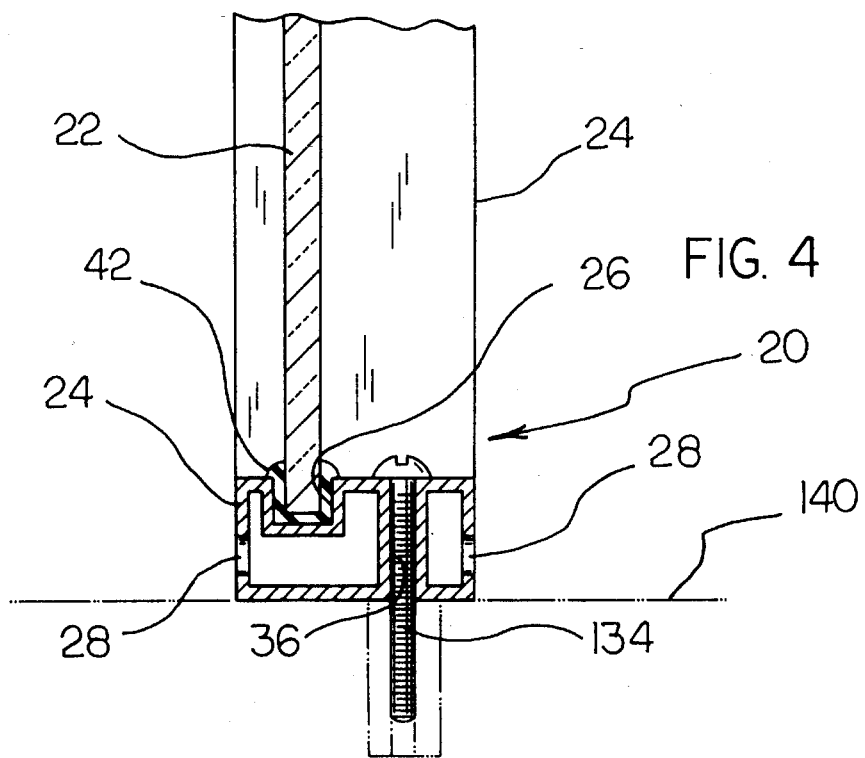

SMOKER'S MODULE

BACKGROUND OF THE INVENTION

1. Field of the Invention

The present invention relates to air purification devices and more particularly pertains to a smoker's module which may be adapted for isolating, containing, venting, and filtering tobacco smoke with a self-contained expandable modular structure adapted for use as both a free-standing unit and as an addition within an existing structure.

2. Description of the Prior Art

The use of air purification devices is known in the prior art. More specifically, air purification devices heretofore devised and utilized for the purpose of collecting and removing undesirable matter from room air are known to consist basically of familiar, expected and obvious structural configurations, notwithstanding the myriad of designs encompassed by the crowded prior art which have been developed for the fulfillment of countless objectives and requirements.

The present invention is directed to improving devices for collecting and removing undesirable matter from room air in a manner which is safe, secure, economical and aesthetically pleasing.

U.S. Pat. Nos. 5,085,134 and 5,181;883, both to Hofstra et al., describe smoker's booths having a walled enclosure with a smoker's access aperture. The presence of a smoker is detected thereby activating the venting and filtering mechanisms. The invention described in the Hofstra patents consists of a relatively small enclosure having an open entry aperture wherethrough smoke may escape. The booth as shown is adapted for use by only a single person while standing, making the device difficult to use when any type of social activity is required. Furthermore, the smoker's booth of the referenced patent is not expandable, further limiting its usefulness.

The prior art also discloses a room ventilating device of U.S. Pat. No. 4,257,319 to Kucharczyk, a room ventilator as shown in U.S. Pat. No. 4,523,630 to Wiklund, and room air purification in U.S. Pat. No. 5,180,552 to Saceman. While these devices fulfill their respective, particular objectives and requirements, the aforementioned patents do not disclose a smoker's module for isolating, containing, venting, and filtering tobacco smoke with a self-contained modular structure adapted for use as both a free-standing unit and as an addition within an existing structure.

In this respect, the smoker's module according to the present invention substantially departs from the conventional concepts and designs of the prior art, and in so doing provides an apparatus primarily developed for the purpose of isolating, containing, venting, and filtering tobacco smoke with a self-contained expandable modular structure adapted for use as both a free-standing unit and as an addition within an existing structure.

Therefore, it can be appreciated that there exists a continuing need for a smoker's module which can be used for isolating, containing, venting, and filtering tobacco smoke with a self-contained expandable modular structure adapted for use as both a free-standing unit and as an addition within an existing structure. In this regard, the present invention substantially fulfills this need.

As illustrated by the background art, efforts are continuously being made in an attempt to develop devices for collecting and removing undesirable matter from room air. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of air purification devices now present in the prior art, the present invention provides a new air purification device construction wherein the same can be utilized for isolating, containing, venting, and filtering tobacco smoke. As such, the general purpose of the present invention, which will be described subsequently in greater detail, is to provide a new Smoker's module apparatus and method which has all the advantages of the prior art air purification devices and none of the disadvantages.

The invention is defined by the appended claims with the specific embodiment shown in the attached drawings. For the purpose of summarizing the invention, the invention may be incorporated into a smoker's module for isolating, containing, venting, and filtering tobacco smoke with a self-contained expandable modular structure adapted for use as both a free-standing unit and as an addition within an existing structure.

The smoker's module comprises a plurality of joinable panel assemblies which, when joined with each other and with an existing floor structure, forms a tobacco smoke isolating enclosure having a plurality of walls, a roof, and at least one sealable user entry door. The panel assemblies each comprise a metal frame having a panel edge receiving groove formed around an inside perimeter. The frame also has an engagement surface formed on an outside perimeter whereby the panel assembly may be joined to an adjacent panel assembly. A transparent safety glass panel is retained within the groove, the panel having a resilient gasket around the edge to prevent tobacco smoke from leaking around the edge of the panel adjacent the groove.

At least one panel assembly is adapted to include a user entry door. The user entry door comprises a door frame pivotally mounted with a pair hinges inside the panel frame. A conventional door handle, mounted to the door frame opposite the hinges, allows convenient user operation of the door. A transparent safety glass panel is mounted within an inside perimetric groove formed in the frame with a resilient gasket providing an airtight seal and also isolating the glass panel from mechanical vibration of normal door opening and closing. Another gasket extends around the outside perimeter of the door frame to prevent tobacco smoke from leaking around the door when it is closed.

A plurality of intake vent apertures extend through lower panel frame members proximal the floor. An exhaust vent aperture, having an electrically powered fan mounted therein, extends through the existing building wall proximal the enclosure roof. The fan generates a pressure differential across the vent apertures which creates a negative air pressure whereby fresh air is drawn into the enclosure through the plurality of intake apertures while tobacco smoke-laden air is simultaneously expelled from the enclosure through the exhaust vent aperture.

The exhaust aperture also has a porous filter element removably therein in series with the fan. Tobacco smoke particles contained within the exhausted air are removed and retained by the filter element prior to the air being released outside the enclosure.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a smoker's module for isolating, containing, venting, and filtering tobacco smoke.

It is another object of the present invention to provide a new smoker's module which may be easily and efficiently manufactured and marketed.

It is a further object of the present invention to provide a new smoker's module which is of a durable and reliable construction.

An even further object of the present invention is to provide a new smoker's module which is susceptible of a low cost of manufacture with regard to both materials and labor, and which accordingly is then susceptible of low prices of sale to the consuming public, thereby making such smoker's modules economically available to the buying public.

Still yet another object of the present invention is to provide a new smoker's module which provides in the apparatuses and methods of the prior art some of the advantages thereof, while simultaneously overcoming some of the disadvantages normally associated therewith.

Still yet another object of the present invention is to provide a smoker's module that is self-contained.

Yet another object of the present invention is to provide a smoker's module that may be adapted for use as both a free-standing unit and as an addition within an existing structure.

Even still another object of the present invention is to provide a smoker's module that is easily expandable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevational view of a roof panel assembly, a gable panel assembly, a side panel assembly, and an end panel assembly of the invention of FIG. 1.

FIG. 4 is a partial sectional view of a side panel assembly showing its manner of construction and attachment to a floor.

DESCRIPTION OF THE PREFERRED EMBODIMENT

Figure 1:
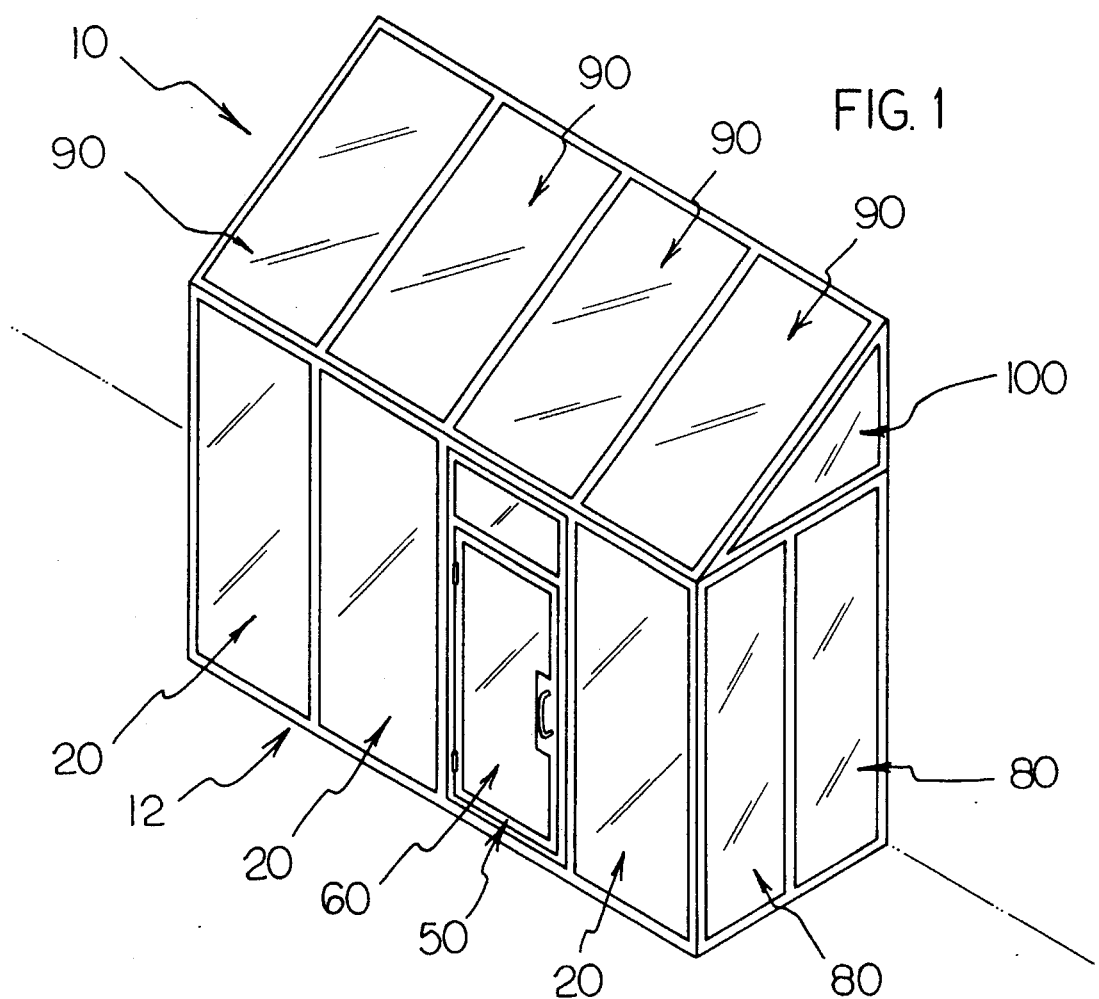
FIG. 1 is a top perspective view of the preferred embodiment of the present invention smoker's module showing its manner of installation within an existing building.
Figure 2:
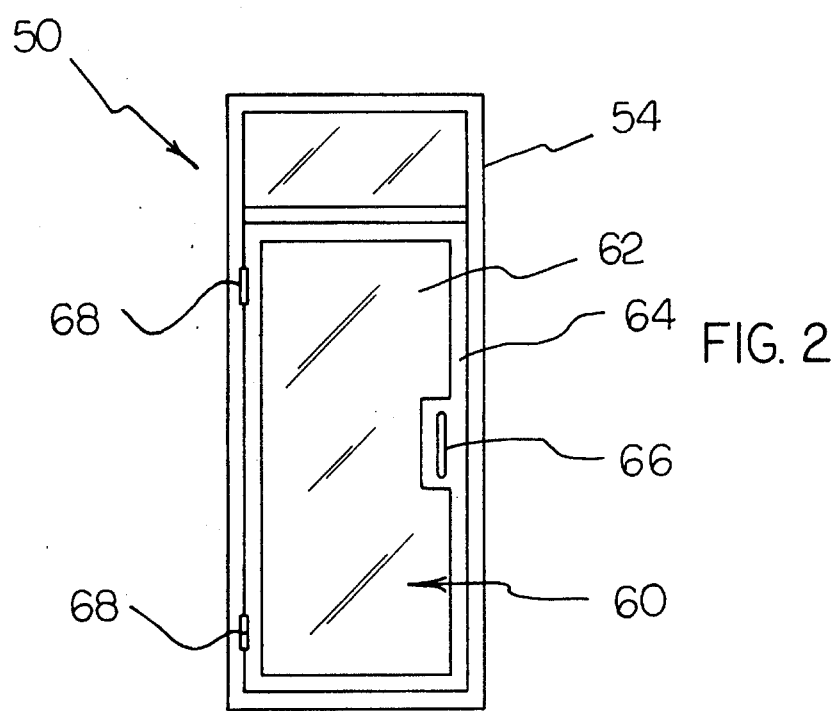
FIG. 2 is a front elevational view of a user entry door panel assembly of the invention of FIG. 1.
Figure 5:
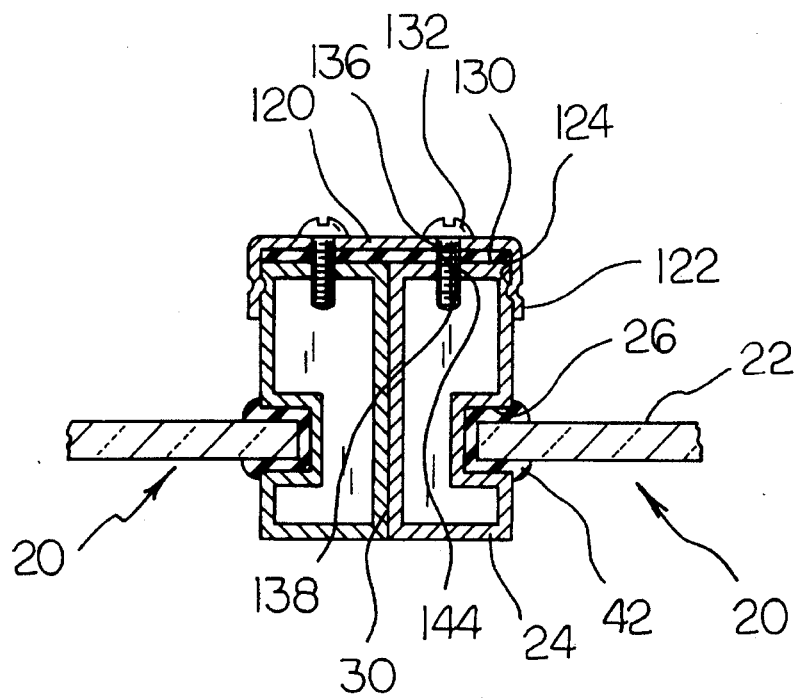
FIG. 5 is a partial sectional view illustrating the manner of joining two adjacent panel assemblies.
Figure 6:
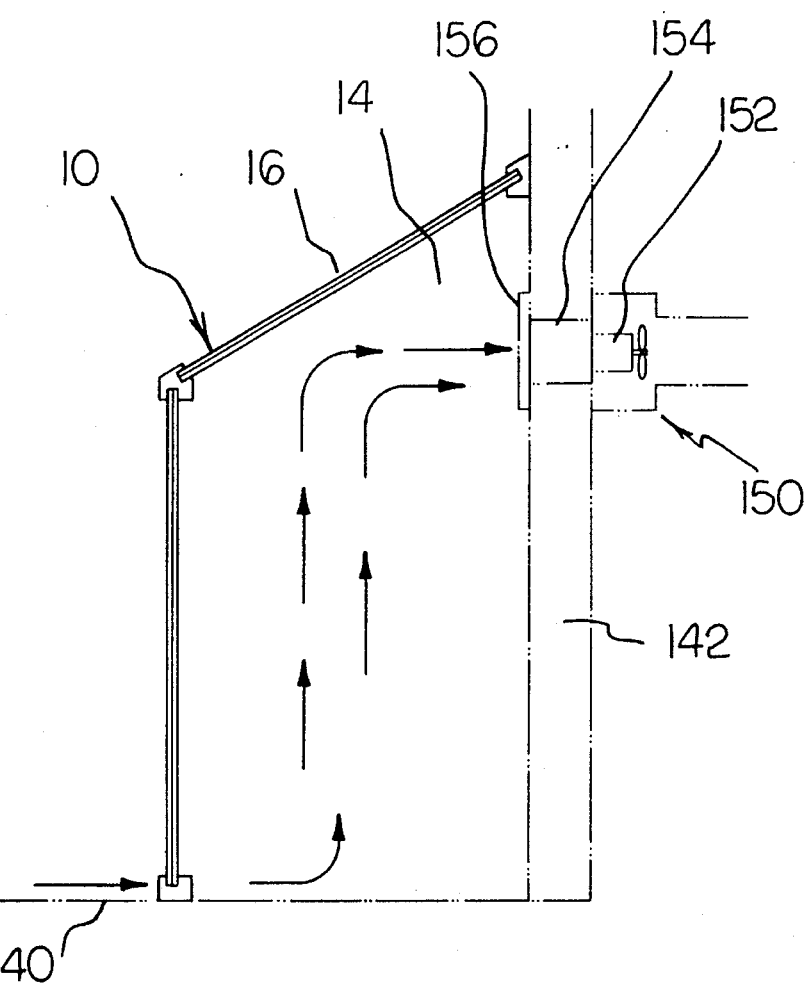
FIG. 6 is a schematic representation of the invention of FIG. 1 showing its manner of operation.

With reference now to the drawings, and in particular to FIG. 1 thereof, a smoker's module embodying the principles and concepts of the present invention and generally designated by the reference numeral 10 will be described.

From an overview standpoint, the smoker's module is adapted for use for isolating, containing, venting, and filtering tobacco smoke with a self-contained modular structure adapted for use as both a free-standing unit and as an addition within an existing structure. See FIG. 1.

With reference now to FIGS. 1–6 and more specifically, it will be noted that a smoker's module 10, adapted for use as addition within an existing building, is shown. The smoker's module 10 comprises a plurality of joinable panel assemblies 20, 50, 80, 90, and 100 which, when joined together and with existing floor 140 and wall 142 structures, form a tobacco smoke isolating enclosure 12 having four walls, a roof, and a sealable user entry door 60. The panel assemblies 20, 50, 80, 90, and 100 each comprise a metal frame 24 having a panel edge receiving groove 26 formed around an inside perimeter. The frame 24 also has an engagement surface 30 formed on an outside perimeter whereby the panel assembly may be joined to adjacent panel assemblies. A transparent safety glass panel 22, retained within the groove 26, has a resilient gasket 42 around the edge to prevent tobacco smoke from leaking around the edge of the panel adjacent the groove.

Panel assemblies are joined together to form the enclosure 12 by butting the engagement surface 30 of a panel assembly against the engagement surface 30 of an adjacent panel assembly. An elongated retaining clip 120 snapidly engages a longitudinal groove 124 formed in the inside perimeter of each frame 24 to fix the panel assemblies in proper alignment with each other. A resilient gasket 130 is sandwiched between the clip 120 and the frame 24 to seal the joint to prevent tobacco smoke from leaking through the joint. A plurality of spaced apart bolts 132 extend through holes 136 and 138 in the clip 120 and gasket 130 and are threadedly engaged with holes 144 through the frame 24 to compress the gasket and to further secure the panel assemblies together.

Panel assemblies are secured to the existing floor 140 and wall 142 with a plurality of spaced apart bolts 134 extending through a plurality of spaced apart lateral holes 36 formed through the frames 28. The bolts 134 threadedly engage with corresponding holes in the floor and wall to fix the edges of each panel assembly in place relative the floor 140 or wall 142.

At least one panel assembly is adapted to include a user entry door 60. The user entry door 60 comprises a door frame 64 pivotally mounted with a pair hinges 68 inside the panel frame 54. A conventional door handle 66, mounted to the door frame 64 opposite the hinges 68, allows convenient user operation of the door 60. A transparent safety glass panel 62 is mounted in the frame 64 with a resilient gasket in the same manner as the other panels to provide an airtight seal and also to isolate the glass panel 62 from mechanical vibration of normal door opening and closing. Another gasket extends around the outside perimeter of the door frame 64 to prevent tobacco smoke from leaking around the door 60 when it is closed.

A plurality of intake vent apertures 28 extend through the panel assembly frames 24 near the floor 140. An exhaust vent aperture 154, having an electrically powered fan 152 mounted therein, extends through the existing building wall 142 proximal the enclosure roof 16. The fan 152 generates a pressure differential across the vent apertures 28 and 154 which creates a negative air pressure inside the enclosure 14 whereby fresh air is drawn into the enclosure through the plurality of intake apertures 28 while tobacco smoke-laden air is simultaneously expelled from the enclosure through the exhaust vent aperture 154.

The exhaust vent aperture 154 also has a porous filter element 156 removably mounted therein, in series with the fan 154. Tobacco smoke particles contained within the exhausted air are removed and retained by the filter element 156 prior to the air being released outside the enclosure.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A smoker's module for isolating, containing, venting, and filtering tobacco smoke with a modular structure adapted for use as to an existing structure said existing structure comprising an existing wall structure and an existing floor structure the smoker's module comprising:

a plurality of joinable panel assemblies which when joined with each other and with said existing floor structure and said existing wall structure form a tobacco smoke isolating enclosure having a plurality of walls, a roof, at least one sealable user entry door, a plurality of intake vent apertures proximal the floor, and an exhaust vent aperture proximal the roof within the existing wall structure;

means to generate a pressure differential across the vent apertures for creating a negative air pressure whereby fresh air is drawn into the enclosure through the plurality of intake apertures while tobacco smoke-laden air is simultaneously expelled from the enclosure through the exhaust vent aperture; and filter means whereby tobacco smoke particles contained within the exhausted air are removed and retained prior to the air being released outside the enclosure.

2. The smoker's module of claim 1 wherein the panel assemblies each comprise: a metal frame having a panel edge receiving groove formed around an inside perimeter thereof, the frame also having an engagement surface formed on an outside perimeter thereof whereby the panel assembly may be joined to an adjacent panel assembly; a resilient gasket disposed within the groove; and a rigid panel retained within the groove such that the gasket prevents air flow around the edge of the panel adjacent the groove.

3. The smoker's module of claim 2 wherein the panel is transparent.

* * * * *